United States Patent [19]

O'Neill et al.

[11] Patent Number: 5,613,298
[45] Date of Patent: Mar. 25, 1997

[54] FORCED ENCAPSULATION CABLE SPLICE ENCLOSURE

[75] Inventors: Andrew J. O'Neill, Cordova, Tenn.; William H. Cook, Levittown; Richard F. Strauss, Morrisville, both of Pa.; Kenneth R. Dumont, Collierville, Tenn.

[73] Assignee: Thomas & Betts Corporation, Memphis, Tenn.

[21] Appl. No.: 373,357

[22] Filed: Jan. 17, 1995

[51] Int. Cl.⁶ .................................................. H01R 43/00
[52] U.S. Cl. .................... 29/869; 156/48; 156/49
[58] Field of Search .......................... 29/869, 870, 871; 156/48, 49, 54, 56

[56] References Cited

U.S. PATENT DOCUMENTS

| | | | |
|---|---|---|---|
| 2,463,231 | 4/1945 | Wyatt . | |
| 2,967,795 | 1/1961 | Bollmeier et al. | 154/2.22 |
| 3,138,657 | 6/1964 | Wengen | 174/92 |
| 3,419,669 | 12/1968 | Dienes | 174/84 |
| 3,499,972 | 3/1970 | Smith | 174/88 |
| 3,519,728 | 7/1970 | Gillemot | 174/76 |
| 3,619,481 | 11/1971 | Smith | 174/138 |
| 3,823,250 | 7/1974 | De Monsy et al. | 174/23 |
| 3,879,574 | 4/1975 | Filreis et al. | 174/76 |
| 3,992,569 | 11/1976 | Hankins et al. | 174/92 |
| 4,025,717 | 5/1977 | Whittingham | 174/88 |
| 4,142,592 | 3/1979 | Brusselmans | 174/92 |
| 4,164,621 | 8/1979 | Silvo | 156/49 X |
| 4,257,630 | 3/1981 | Bartell et al. | 285/21 |
| 4,282,397 | 8/1981 | Siedenburg et al. | 174/92 |
| 4,436,566 | 3/1984 | Tight, Jr. | 156/56 |
| 4,472,222 | 9/1984 | Moisson et al. | 156/86 |
| 4,484,962 | 11/1984 | Dienes et al. | 156/49 |
| 4,511,611 | 4/1985 | Moisson | 428/35 |
| 4,545,830 | 10/1985 | Dienes et al. | 156/48 |
| 4,581,265 | 4/1986 | Follette | 428/36 |
| 4,639,546 | 1/1987 | Meltsch | 174/92 |
| 4,647,719 | 3/1987 | Campbell et al. | 174/93 |
| 4,648,919 | 3/1987 | Diaz et al. | 156/48 |
| 4,685,981 | 8/1987 | Dienes . | |
| 4,731,271 | 3/1988 | Heucke et al. | 428/36 |
| 4,732,628 | 3/1988 | Dienes | 156/48 |
| 4,740,653 | 4/1988 | Hellbusch | 174/21 |
| 4,742,181 | 5/1988 | Dienes | 174/16 |
| 4,875,952 | 10/1989 | Mullin et al. | 156/48 |
| 4,933,512 | 7/1990 | Nimiya et al. | 174/92 |
| 5,185,844 | 2/1993 | Bensel, III et al. | 385/135 |
| 5,245,133 | 9/1993 | DeCarlo et al. | 174/93 |
| 5,251,373 | 10/1993 | DeCarlo et al. | 29/870 |
| 5,254,809 | 10/1993 | Martin | 174/68 |
| 5,258,578 | 11/1993 | Smith et al. | 174/93 |
| 5,331,114 | 7/1994 | Rudolph | 174/93 |
| B1 4,545,830 | 8/1989 | Dienes et al. | 156/48 |

FOREIGN PATENT DOCUMENTS

| | | |
|---|---|---|
| 0384176A3 | 8/1990 | European Pat. Off. . |
| 0538009A3 | 4/1993 | European Pat. Off. . |

OTHER PUBLICATIONS

Raychem XAGA 1600, Buried Splice Closure System, 2 pages, undated.

*Primary Examiner*—Carl J. Arbes
*Attorney, Agent, or Firm*—Michael L. Hoelter; Salvatore J. Abbruzzese

[57] ABSTRACT

The method and apparatus is provided for sealing a splice in an electrical cable. A pair of spaced-apart sealing dams are formed about the electrical cable with the splice being located therebetween. A generally cylindrical splice enclosing shell, having a pair of opposed open ends is supported around the splice. The shell includes plural shell fingers extending from each end of the shell. The shell fingers are secured to each other at a location outwardly adjacent of the sealing dams to positionally confine the sealing dams, preventing outward migration thereof. The splice may be encapsulated with an encapsulant under pressure, which is retained by the splice enclosing shell.

21 Claims, 5 Drawing Sheets

//  5,613,298

FORCED ENCAPSULATION CABLE SPLICE ENCLOSURE

BACKGROUND OF THE INVENTION

The present invention relates generally to a method and apparatus for sealably enclosing a cable splice. More particularly, the present invention relates to a method and apparatus for providing a cable splice enclosure which accommodates forced encapsulant therein for sealing the cable.

FIELD OF THE INVENTION

Electrical cables, especially telecommunications cables are typically run outdoors, either Suspended overhead or buried underground. In order to effect repairs to the individual conductors within the cable, or to make interconnections thereto, the integrity of the cable must be violated. Once repairs or interconnections are accomplished, the exposed area of the cable, commonly referred to as a cable splice, must be resealed in order to protect the conductors against the outdoor environment.

Many techniques are currently known for sealably covering cable splices. One particularly effective technique is to use a cable splice closure, which includes an enclosure filled with an encapsulant which fully surrounds the splice to seal the splice against moisture penetration which is prevalent in outdoor environments. These encapsulants are typically provided in a fluid state and poured into the enclosure over the cable splice. The encapsulant may be forced into the enclosure under pressure so that the encapsulant fully surrounds the cable splice and fills the interstices between conductors. The encapsulant then cures to a gel-like consistency to effectively seal the splice.

In order to retain the encapsulant under pressure prior to curing, the ends of the enclosure must be sealed. End seals generally fall into two categories. The first type of end seals which may be used in combination with splice enclosures are rigid end seals. These end seals are clamped in sealed fashion to spaced apart locations on the cable on either side of the splice. The splice enclosure is then sealably secured to the end seals at each end thereof. Rigid end seals of this type provide an effective technique for sealably closing the opposed ends of a splice enclosure so as to resist moisture intrusion, as well as retain encapsulant which is forced into the enclosure. An example of rigid end seals used in combination with a cable splice enclosure is shown in U.S. Pat. Nos. 5,245,133 and 5,251,373. While extremely effective, these rigid end seals are multi-component devices requiring skilled installation. Also, due to their rigidity, these known end seals do not permit sufficient variation in closure diameter. As these end seals typically have fixed diameters, they require the installer to use fixed size closures, which often results in wasted encapsulant.

A second approach is to employ sealing collars or dams about the cable on either side of the splice. Each sealing dam may be formed, for example, by wrapping mastic tape around the cable to form a buildup of mastic about which the ends of the enclosure may be positioned. The mastic provides for good sealing contact with cable as well as with the enclosure. The mastic tape, while sufficiently viscous to permit wrapping and positioning about the cable, does exhibit some degree of flow. While this permits good compressive engagement to be made, it does make securement of the cover around the dams more difficult. The enclosure is typically secured by applying a compression strap over the enclosure about the sealing dams as well as at other locations. However, compression of the straps may tend to cause movement of the mastic. Also, upon forcing encapsulant into the enclosure, the mastic sealing dams have a tendency to migrate out from the enclosure due to the internal pressure applied by the encapsulant. In order to prevent this tendency, the craftsperson must secure the sealing dams to the ends of the enclosure. This is typically accomplished by wrapping the ends of the enclosure and the cable adjacent the sealing dams with a sealing tape. As can be seen, this requires additional steps as well additional materials which must be carried by the installer. Further the integrity of such a tape-wrapped assembly is extremely craft-sensitive and cannot always be assured.

It is therefore desirable to provide an end seal and a splice enclosure which can be easily applied, and which will not migrate due to the pressurized encapsulant being forced into the enclosure.

SUMMARY OF THE INVENTION

It is an object of the present invention to provide a method and apparatus for sealably closing a cable splice.

It is a further object of the present invention to provide a cable splice closure including an enclosure shell and a pair of end seals which surround the splice and accommodate curable encapsulant therebetween.

It is still a further object of the present invention to provide a cable splice enclosure shell which includes provisions for securing the end seals of the enclosure, so as to prevent outward migration thereof upon pressurized insertion of the encapsulant about the cable splice.

It is yet a further object of the present invention to provide an improved method and apparatus for providing end seals for a cable splice enclosure which retain forced encapsulant therebetween.

In the efficient attainment of these and other objects, the present invention provides an improved method and apparatus for sealing a splice in an electrical cable. A pair of spaced-apart sealing dams are formed about the cable with the cable splice being located between the dams. An elongate, generally cylindrical splice enclosing shell having opposed open ends is positioned around the cable splice with the sealing dams closing the open ends of the shell. The splice enclosing shell includes plural elongate shell fingers extending from each of the open ends of the shell. The fingers are positionable adjacent the sealing dams and are secured to each other at a location outwardly of the sealing dams so as to confine the dams, preventing outward migration thereof.

As more particularly described by way of the preferred embodiment herein, the sealing dams may be constructed by forming a sealing collar of mastic tape or closed cell foam, or a combination of the tape and the foam. The splice enclosing shell may be a split unitary member which is wrapped around the splice and the sealing dams with the overlapping edges being sealed. The shell may be transversely scored so as to permit the proper length to be constructed so as to accommodate a given splice diameter. The shell fingers are elongate members having proximal portions which extend along the sealing dams and distal portions which accommodate a compressive fastening member such as a cable tie, to secure the fingers outwardly of the sealing dams. The shell may accommodate a curable encapsulant for disposition around the splice. The encapsulant may be injected into the shell under pressure so that upon curing, the splice is entirely sealed. The extending shell fingers further include retaining elements at the distal portions which help attach the cable tie to the fingers.

DETAILED DESCRIPTION OF THE PREFERRED EMBODIMENT

Figure 1:
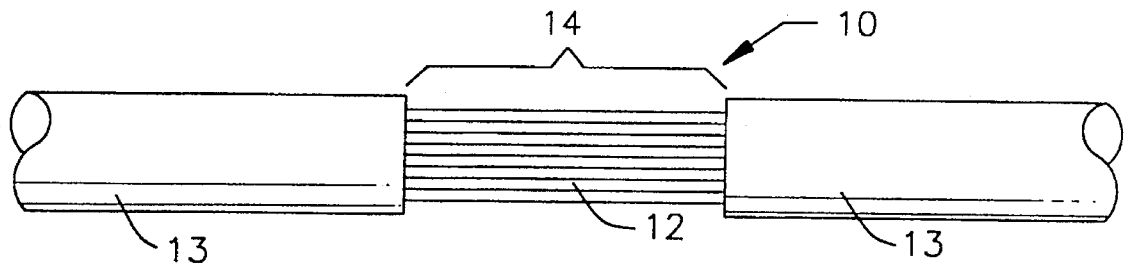
FIG. 1 is a side elevational view of a portion of an electrical cable having an exposed central area referred to as a cable splice.

Referring to FIG. 1, an extant of telecommunications cable 10 is shown. Cable 10 includes a plurality of individually insulated electrical conductors 12 extending through an outer insulative cable jacket 13. Conductors 12, which are of conventional construction, each being formed of copper and having plastic insulation thereover, are shown schematically. A portion of cable jacket 13 is typically removed to create an exposed area 14, which permits access to conductors 12 for repairs, maintenance, or to splice additional conductors thereto in a manner which is well-known in the art. The exposed area 14 is created by cutting away a portion of jacket 13. The exposed area 14 and the repairs or splices made thereat is typically referred to as a cable splice or cable splice location, and these terms may be used interchangeably to describe the exposed area 14 of cable 10. After effecting repairs or splices to the cable, the cable splice 14 must be covered for protective purposes. The description which follows sets forth the preferred method and apparatus of the present invention for sealably covering cable splice 14.

Figure 2:
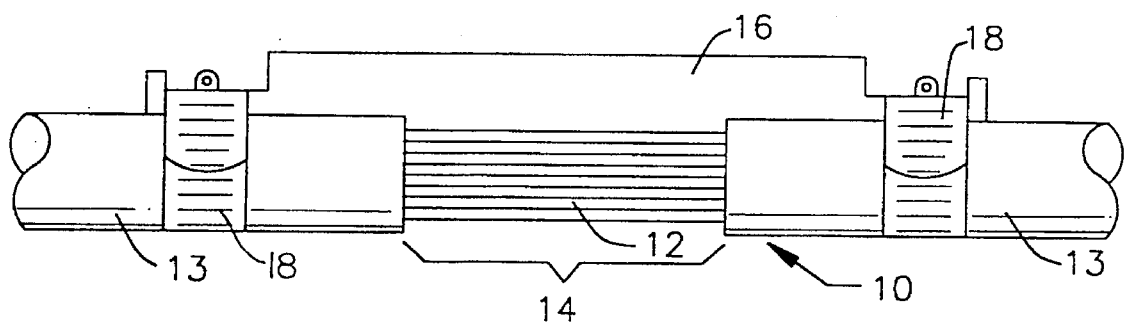
FIG. 2 is a side elevational showing of the electrical cable of FIG. 1 with a stabilizing bar being positioned across the cable splice.

Referring now to FIG. 2, the present invention employs a stabilizer bar 16, which is constructed of length sufficient to span splice 14. Stabilizer bar 16 is formed of a sufficiently rigid material such as metal, and is anchored to the cable jacket 13 on either side of splice 14. Compression clamps 18 or other compressive fastening members may be used to secure stabilizer bar 16 to jacket 13 of cable 10. Stabilizer bar 16 provides structural stability to splice 14, preventing sharp bending thereat which could adversely affect the connections or repairs made to splice 14. Also in certain situations, stabilizer bar 14 may also function as a ground strap assuring electrical ground continuity across splice 14. At a stage either prior to or after installation of stabilizer bar 16, repairs, maintenance or splices may be made to conductors 12 at splice 14. These repairs or splices may be accomplished in a manner well known in the art.

Figure 3:
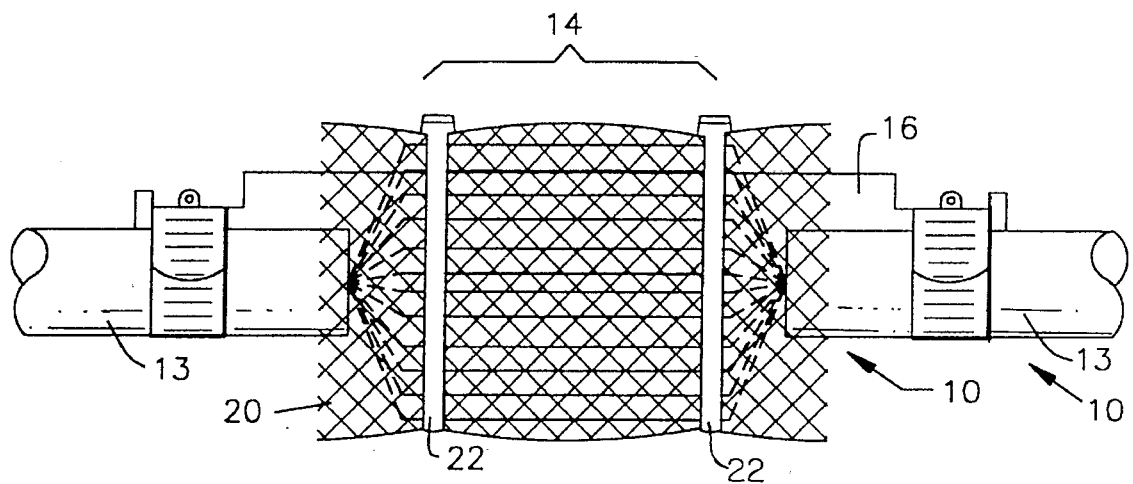
FIG. 3 shows the cable of FIG. 2 with a spacer web positioned about the cable splice.

Referring to FIG. 3, splice 14 is covered with a spacer web 20. Web 20 is generally a mesh-like member which is wrapped around splice 14 and secured thereto using cable ties 22 or other fastening members. As will be described in further detail hereinbelow, spacer web 20 permits the effective encapsulation of splice 14 with a curable encapsulant. Spacer web 20 is of the type which is shown and described in commonly assigned U.S. Pat. No. 4,685,981 issued on Aug. 11, 1987, entitled "Method and Apparatus for Providing a Spacer to a Cable Splice".

Figure 4:
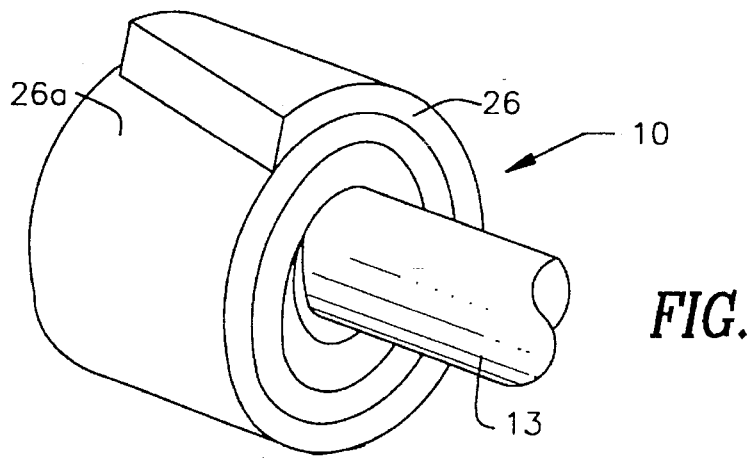
FIG. 4 shows a portion of the electrical cable of FIG. 1 adjacent one side of the splice, with a foam end seal being placed therearound.
Figure 5:
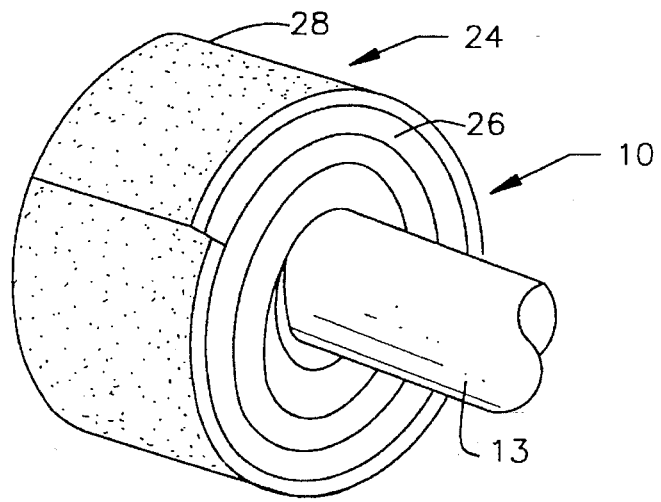
FIG. 5 shows the cable portion of FIG. 4 with a mastic tape placed about the foam end seal.

Referring now to FIGS. 4 and 5, construction of end seals or sealing dams 24 (FIG. 5) may be described. As sealing dams 24 are formed about cable jacket 13 on each side of splice 14 in an identical manner, only formation of one sealing dam 24 will be described with reference to FIGS. 4 and 5. Sealing dam 24 is initially constructed by employing a closed cell foam 26 which may be provided in roll form. Foam 26 is generally a compressible, closed cellular structure. Foam 26 may include adhesive backing on one or both longitudinal planar surfaces 26a, so as to permit the foam to be adhesively wrapped about cable jacket 13. The adhesive surfaces 26a, which may be exposed by removal of release liners (not shown), permit the foam 26 to be adhesively secured to the cable as well as to itself when wrapped therearound. In preferred construction, the foam is wrapped about the cable jacket 13 until the built up diameter of the wraps of foam is larger than the diameter of the splice 14.

Referring to FIG. 5, after the foam 26 is properly positioned about cable jacket 13, a wrapping of mastic tape 28 may be placed thereover. Mastic tape 28 is formed of a tacky, generally compressible mastic which may be supplied in a tape-like rolled form. The mastic tape 28 is wrapped about the foam 26 to further increase the circumference of the sealing dam 24. As shown in FIG. 5, a combination of a foam wrap and a mastic wrap forms sealing dam 24. While this combination is shown as the preferred construction, it is contemplated that other constructions may also be formed. Constructions such as successive alternating wraps of tape and foam may be employed. The present invention further contemplates the use of foam 26 or mastic tape 28 alone to form sealing dam 24. However, as will be described in further detail hereinbelow, it has been found that the combination of a first layer of foam 26 with a wrapping of mastic tape 28 thereover provides superior end sealing, as well as structural integrity.

Figure 6:
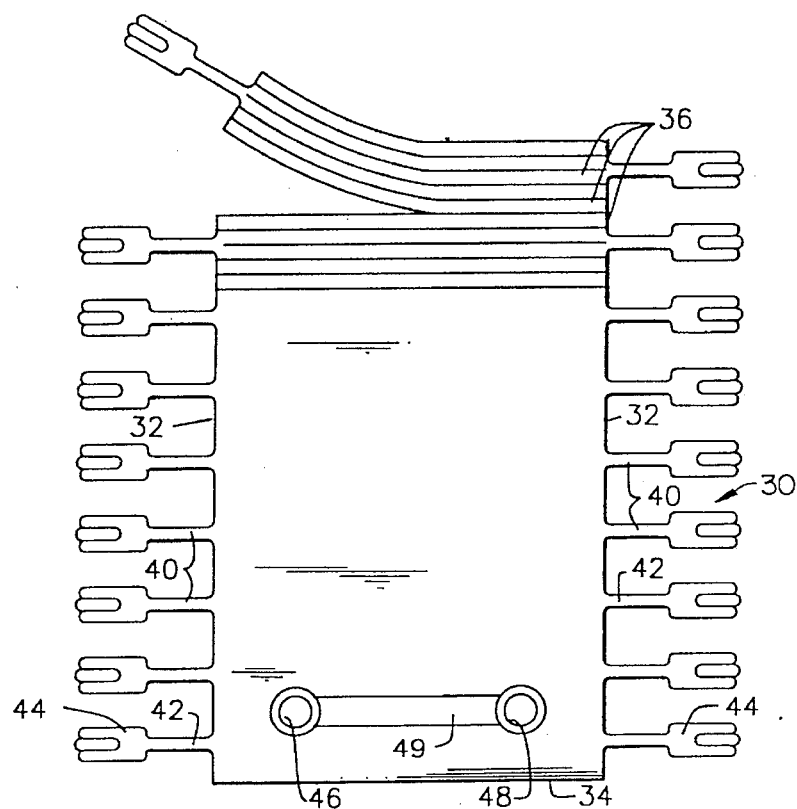
FIG. 6 shows the splice enclosure shell of the present invention used to cover the cable splice shown in FIG. 3.

Referring now to FIG. 6, cable enclosure shell 30 of the present invention is shown. Shell 30 is an elongate flexible planar sheet of plastic material. Shell 30 is generally rectangular, having opposed longitudinal edges 32 and opposed transverse edges 34. The distance between longitudinal edges 32 is constructed so that shell 30 spans cable splice 14 (FIG. 3). In use, shell 30 is wrapped in a cylindrical manner with opposed transverse edges 34 overlapping to form an elongate split unitary cylindrical structure (FIG. 7) having opposed open ends 32a defined by rolled longitudinal edges 32.

Other constructions of shell 30 are also within the contemplation of the present invention. Hard shells having upper and lower shell halves such as those shown in the above identified '133 and '373 patents may also be employed. However, the flexible shell 30 shown herein has particular utility as it permits use on cable splices 14 of various diameters.

As the diameter of splice 14 may vary depending upon the amount of repairs or interconnections conducted thereat, the length of the planar sheet forming shell 30 may be varied. Shell 30 includes a plurality of longitudinally spaced transversely extending ridges 36, along which shell 30 may be scored and cut or torn to vary the length of the shell. An appropriate cutting tool (not shown) may be used to cut or tear the shell 30 along one of score lines 36.

For purposes which will be described in further detail hereinbelow, shell 30 includes a plurality of spaced fingers 40. Fingers 40 extend outwardly from longitudinal edges 32. In the preferred embodiment, fingers 40 are integrally formed with shell 30. Also as shown, each finger 40 includes a narrow proximal portion 42 immediately extending from longitudinal edge 32 and a wider distal portion 44, spaced from longitudinal edge 32.

Shell 30 further includes an inlet port 46 and a transversely spaced outlet port 48 therethrough. Ports 46 and 48 may be formed integrally with the formation of shell 30 or may be placed in shell 30 after formation thereof. In the present illustrative embodiment, an integrally formed structural reinforcing member 49 spans the space between ports 46 and 48. The use of ports 46 and 48 will be described in further detail hereinbelow. The structural reinforcing member 49 performs a secondary function of providing a path for air to travel to the outlet port 48.

Figure 7:
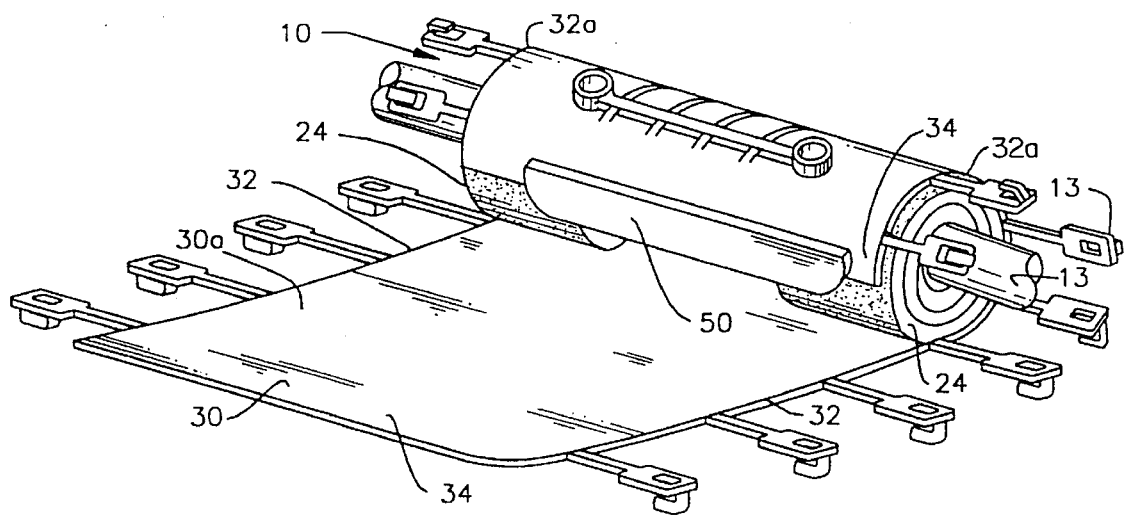
FIG. 7 shows the splice enclosure shell of FIG. 6 partially wrapped about the cable splice.

Referring more specifically to FIG. 7, shell 30 may be wrapped around cable splice 14. After shell 30 is cut to the desired length, the shell 30 is positioned about splice 14 with one planar surface 30a positioned in contact with sealing dams 24. The shell is positioned so that sealing dams 24 are adjacent longitudinal edges 32 of shell 30. In this manner, when shell 30 is formed into a cylindrical structure, sealing dams 24 close open ends 32a thereof. Shell 30 is positioned so that opposed transverse edges 34 overlap. A strip of gasketing material 50 may be interposed between the overlapped edges 34. Any suitable gasketing material may be employed. In fact, it is contemplated that either or both of strips of foam 26 or mastic tape 28 may be employed as a sealing gasket. When properly overlapped, shell 30 forms a unitary cylindrical enclosure 52 about splice 14 (FIG. 8) with sealing dams 24 closing opposed open ends 32a thereof.

In order to retain shell 30 in a closed cylindrical construction, a plurality of radially compressive retaining straps 54 may be positioned therearound. One or more of the straps 54a is positioned directly over each of sealing dams 24. In this manner, tight compressive engagement is maintained between shell 30 and sealing dam 24 adjacent open end 32a.

The present construction of sealing dams 24, as above described, formed with a combination of closed cell foam 26 and mastic tape 28, provides a superior seal at open ends 32a of shell 30. The above described combination of foam 26 and mastic tape 28 provides sufficient rigidity to sealing dams 24, reducing this tendency.

Figure 8:
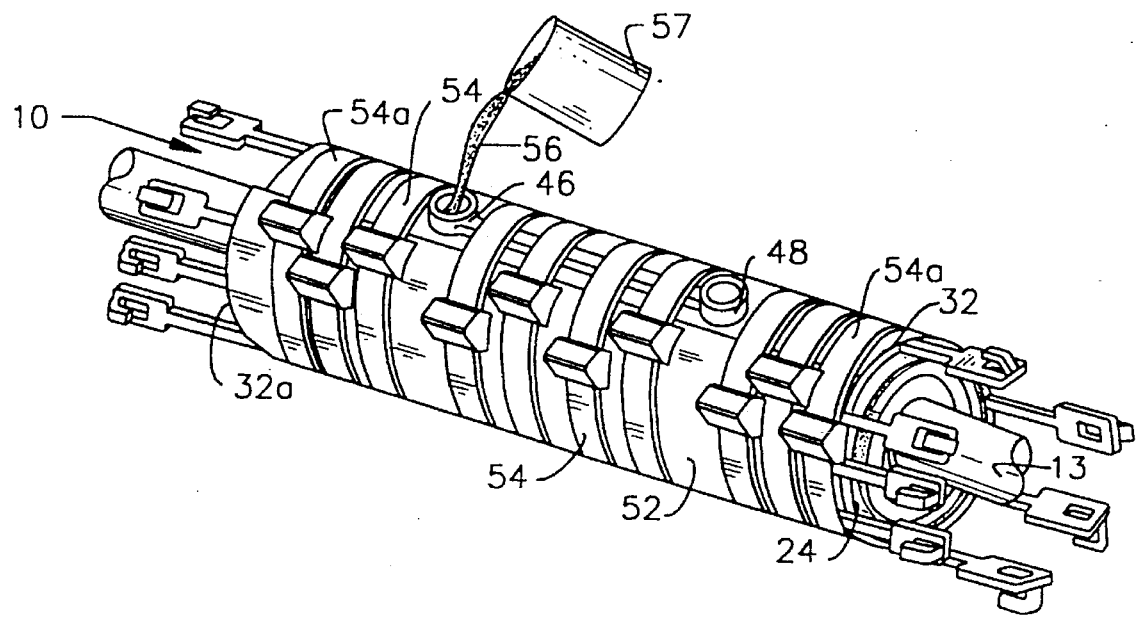
FIG. 8 shows the splice enclosure shell of FIG. 6 positioned about the cable splice with encapsulant being poured thereinto.

Having constructed enclosure 52 about splice 14, effective sealing of the splice 14 may be achieved by introducing an encapsulant 56 into enclosure 52 (FIG. 8). In order to effectively seal splice 14 and to ensure that the encapsulant seals between the interstitial spaces of the individual insulated conductors 12, the encapsulant 56 may be injected into enclosure 52 under pressure. A method and apparatus for encapsulating a cable splice under pressure is shown and described in above-mentioned U.S. Pat. No. 5,245,133 issued Sep. 14, 1993, entitled "Moisture Resistant Cable Splice and Sealing Structure Thereof" and U.S. Pat. No. 5,251,373 issued Oct. 12, 1993, entitled "Method for Protection of Cable Splice". These patents are incorporated herein by reference.

In the preferred embodiment shown herein, encapsulant 56 is poured into enclosure 52 from a suitable container 57 through inlet port 46. The encapsulant may be applied under pressure or may be subsequently pressurized. Spacer web 20 (FIG. 3) permits encapsulant to flow completely around splice 14. Outlet port 48 serves to permit the escape of air to allow enclosure 52 to be filled with encapsulant 56. Outlet port may also serve to permit escape of some encapsulant providing indication that the enclosure is filled. Alternatively, a check valve 62 and a pressure relief valve 64 (FIG. 10) may be interposed in ports 46 and 48, respectively, in a manner taught in the above-referenced '133 and '373 patents. As the encapsulant 56 is forced into enclosure 52 under pressure, there is a tendency for the encapsulant to exert outward pressure on sealing dams 24 closing open ends 32a of shell 30. Such outward pressure may be sufficient to cause migration of the sealing dams 24 out from the open ends 32a of shell 30. In order to prevent such outward migration, sealing dams 24 are retained by extending fingers 40.

Figure 9:
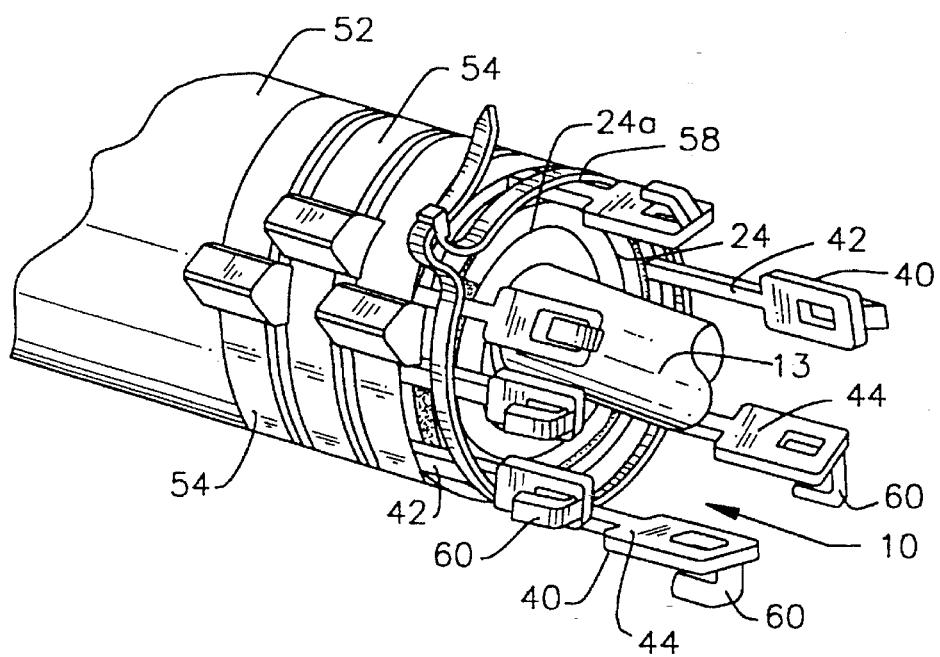
FIG. 9 shows a portion of the splice enclosure of FIG. 8, with extending shell fingers adapted to be connected to each other.

Referring to FIG. 9, a cable tie 58 or other radially-compressive fastening member is looped around cable jacket 13 and extending fingers 40 which extend circumferentially about jacket 13. The cable tie 58 is tightened so that the tie comes in contact with distal portions 44 of fingers 40. Each of distal portions 44 includes an outwardly extending retaining element 60, which is preferably in the shape of a reverse hook. While hook-shaped retaining elements 60 are shown as the preferred technique for supporting and retaining cable tie 58, other techniques may also be employed. The cable tie 58 may be threaded or snapped into the hook-shaped retaining elements 60.

Figure 10:
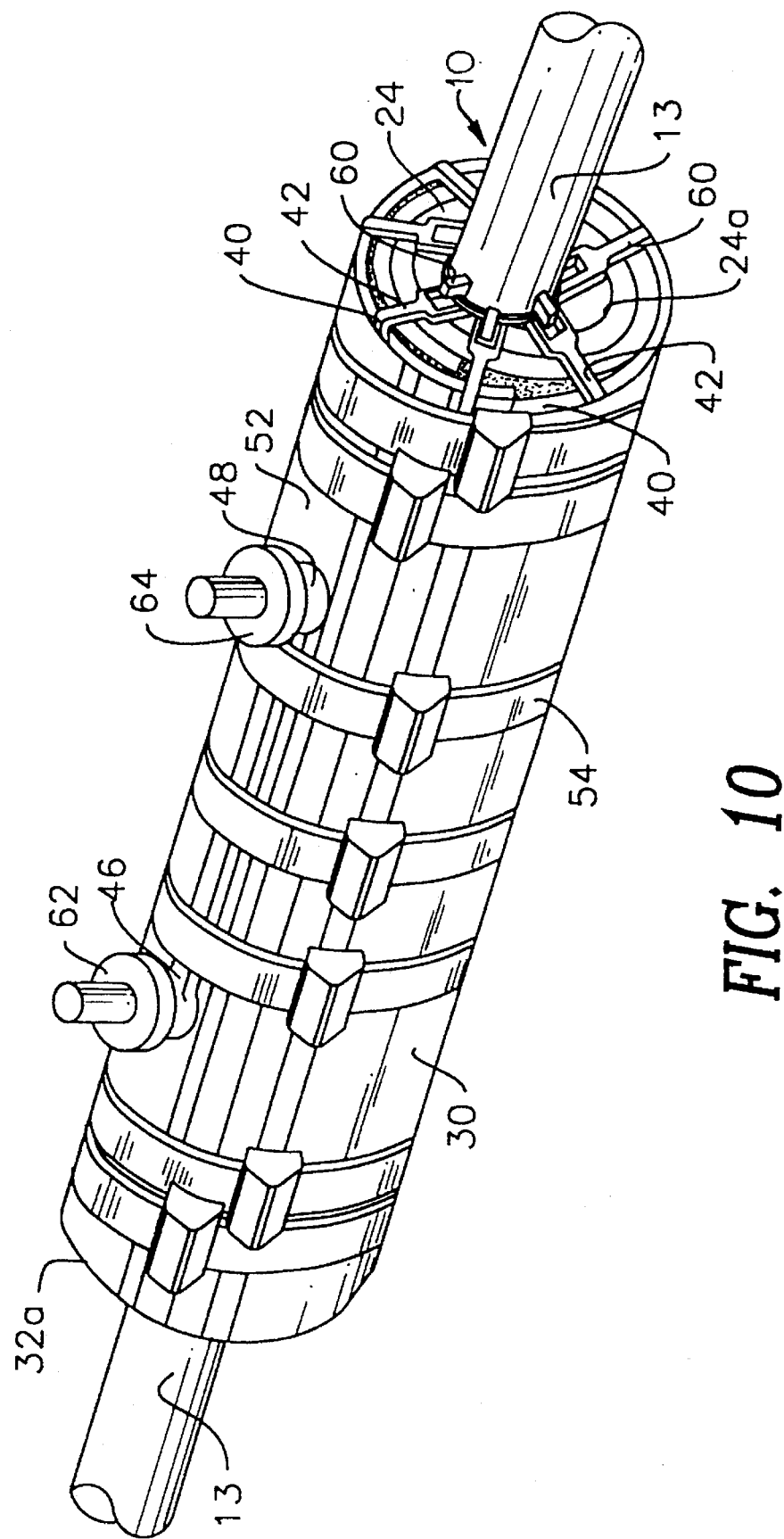
FIG. 10 shows the completed splice enclosure of the present invention.

As seen in FIG. 10, the cable tie 58 is then tightened, preferably by hand, about cable jacket 13. In this manner, the proximal portions 42 of fingers 40 are positioned along an exterior annular surface 24a of sealing dams 24. The cable tie 58 being retained by retaining elements 60, secures the fingers 40 to each other outwardly adjacent sealing dam 24 preventing movement thereof. In the preferred embodiment the retaining elements 60 in the secured positions do not contact the cable jacket 13, but lie in position spaced above the jacket 13 forming a diameter substantially less than the outer diameter of the sealing dams 24. However, the retaining elements 60 may also lie on the cable jacket 13 within the scope of the invention. Such securement prevents outward migration of sealing dam 24 upon the forced encapsulation of splice 14. As described in the above referenced incorporated patents, the encapsulant 56 cures to a gel-like consistency, establishing a moisture barrier in a relatively short period of time (about one hour). Therefore, it is only necessary for the fingers 40 to positionally confine sealing dams 24 until such time as the encapsulant cures and no further pressure is exerted upon sealing dams 24.

Various changes to the foregoing described and shown structures would now be evident to those skilled in the art. Accordingly, the particularly disclosed scope of the invention is set forth in the following claims.

We claim:

1. A method of sealing a splice in an elongate electrical cable comprising the steps of:

disposing a pair of spaced-apart sealing dams about said cable with said splice being located between said dams;

providing an elongate generally cylindrical splice-enclosing shell having a pair of opposed open ends and plural elongate shell fingers extending from each of said ends;

placing said shell over said splice with said open ends being adjacent said sealing dams and said shell fingers extending outwardly beyond said sealing dams; and securing said shell fingers to each other at a location outwardly adjacent said dams to positionally confine said dams, preventing outward migration thereof.

2. A method in accordance with claim 1 wherein said disposing step further includes:

providing a mastic tape; and wrapping said mastic tape about said cable.

3. A method in accordance with claim 1 wherein said disposing step further includes:

providing a longitudinal extent of closed-cell foam; and positioning said foam about said cable.

4. A method in accordance with claim 3 wherein said positioning step includes:

providing said foam with an adhesive backing; and adhesively securing said foam to said cable.

5. A method in accordance with claim 3 wherein said disposing step further includes:

providing a mastic tape; and wrapping said mastic tape about said foam.

6. A method in accordance with claim 1 wherein said shell is a split unitary member and wherein said placing step includes:

wrapping said split member about said cable with opposed portions thereof being placed in overlapped disposition; and sealing said opposed overlapped portions of said split member.

7. A method in accordance with claim 6 wherein said sealing step further includes interposing a sealing strip between overlapped portions of said split member.

8. A method in accordance with claim 1 wherein said shell fingers include proximal finger portions and distal finger portions and wherein said securing step further includes:

positioning said proximal finger portions in contact with said sealing dams; and securing said distal finger portions adjacent to but spaced from said cable.

9. A method in accordance with claim 8 wherein said step of securing said distal finger portions includes:

providing a compressive fastening member; and applying said compressive fastening member to said distal finger portions.

10. A method in accordance with claim 9 wherein said distal finger portions each include a retainer element thereon and wherein said applying step further includes:

attaching said compressive fastening member to said distal finger portion with said retainer elements.

11. A method in accordance with claim 1 further including the steps of introducing a curable encapsulant within said shell.

12. A method in accordance with claim 11 wherein said shell includes a port therein and wherein said introducing step includes introducing said curable encapsulant into said shell through said port.

13. A method in accordance with claim 11 further including pressurizing said curable encapsulant within said shell.

14. A method in accordance with claim 13 wherein said shell includes an inlet port and an outlet port therethrough and wherein said pressurizing step further includes introducing said curable encapsulant through said inlet port under pressure until said encapsulant exits through said outlet port.

15. A method in accordance with claim 14 further including the step of interposing a pressure relief valve in said outlet port.

16. A method of sealably covering a spice in an elongate electrical cable comprising the steps of:

forming a sealing dam on each side of said splice;

covering said splice and said sealing dams with an elongate splice enclosure, said splice enclosure including dam retaining elements extending from opposite ends of splice enclosure; and securing said dam retaining elements to prevent outward, longitudinal movement of said sealing dam.

17. A method in accordance with claim 16 further including the step of introducing an encapsulant into said splice enclosure about said splice.

18. A method in accordance with claim 17 wherein said dam retaining elements include plural elongate fingers and wherein said securing step further includes:

disposing a proximal extent of said fingers along said sealing dam; and positioning distal extents of said fingers to each other adjacent to said cable.

19. A method in accordance with claim 16 wherein said forming step includes disposing a mastic about said cable.

20. A method in accordance with claim 16 wherein said forming step includes:

providing a closed-cell foam; and disposing said foam about said cable.

21. A method in accordance with claim 16 wherein said forming step includes:

providing a closed-cell foam;

positioning said closed-cell foam about said cable;

providing a mastic tape; and wrapping said mastic tape about said foam.

* * * * *